US007222201B2

(12) United States Patent
Augustin et al.

(10) Patent No.: US 7,222,201 B2
(45) Date of Patent: May 22, 2007

(54) VIRTUAL ENDPOINT FOR USB DEVICES

(75) Inventors: Ryan Augustin, Santa Cruz, CA (US);
David Raaum, San Jose, CA (US);
Reid Augustin, Menlo Park, CA (US)

(73) Assignee: PLX Technology, Inc., Sunnyvale, CA (US)

( * ) Notice: Subject to any disclaimer, the term of this patent is extended or adjusted under 35 U.S.C. 154(b) by 314 days.

(21) Appl. No.: 10/338,067

(22) Filed: Jan. 6, 2003

(65) Prior Publication Data
US 2004/0133708 A1    Jul. 8, 2004

(51) Int. Cl.
*G06F 13/42* (2006.01)
(52) U.S. Cl. ...................................... 710/105; 710/305
(58) Field of Classification Search ............... 710/105, 710/104, 9; 370/402
See application file for complete search history.

(56) References Cited

U.S. PATENT DOCUMENTS

| | | | | |
|---|---|---|---|---|
| 6,070,208 A | * | 5/2000 | Brief ........................... | 710/104 |
| 6,219,736 B1 | * | 4/2001 | Klingman ................... | 710/315 |
| 6,247,057 B1 | * | 6/2001 | Barrera, III ................. | 709/229 |
| 6,377,572 B1 | * | 4/2002 | Dolan et al. ................ | 370/355 |
| 6,389,029 B1 | * | 5/2002 | McAlear ..................... | 370/402 |
| 6,590,897 B1 | * | 7/2003 | Lauffenburger et al. . | 370/395.6 |
| 6,631,426 B1 | * | 10/2003 | Staats ........................... | 710/9 |
| 6,721,332 B1 | * | 4/2004 | McAlear ..................... | 370/466 |
| 6,959,350 B1 | | 10/2005 | Luke et al. | |
| 2003/0041205 A1 | * | 2/2003 | Wu et al. .................... | 710/302 |
| 2003/0097512 A1 | * | 5/2003 | Mizokuchi et al. ......... | 710/305 |

OTHER PUBLICATIONS

Morris Mano, "Computer System Architecture", 1982, Prentice-Hall, Inc., 2nd Ed., pp. 159-161.*
James Peterson and Abraham Silberschatz, "Operating System Concept", 1985, Addison Westley Inc., 2nd Ed., pp. 120-125.*
Intel, "USB Feature Specification Dynamic Logical-Device", 1999, Intel Corp., Rev. 1.0.*
Symbian, "Class DUsbClientController", 2002, SYmbian Inc..*
Standard Microsystems Corporation, "Multi-Endpoint USB Peripheral Controller with Integrated 5 Port Hub", 2000, SMSC.*
Compaq et al., "Universal Serial Bus Specification", 2000, Compaq Inc., et al., Rev. 2.0, pp. 25-83.*
Compaq et al., "USB Specification 2.0", Apr. 2000, p. 37.*
"Universal Serial Bus Specification, Revision 2.0," 2000, www.usb.org/developers/docs.html, pp. 31-36, 197, 228, 269-273.

* cited by examiner

*Primary Examiner*—Khanh Dang
(74) *Attorney, Agent, or Firm*—Parsons Hsue & de Runtz LLP

(57) ABSTRACT

In a USB device, virtual endpoint capability allows a number of physical endpoints in the device to support a larger number of data pipes at logical endpoints requested by the host. This is done by re-assigning physical endpoints to support the logical endpoint requested by the host. The logical endpoints and their corresponding data pipes may be served in a round robin scheme.

36 Claims, 3 Drawing Sheets

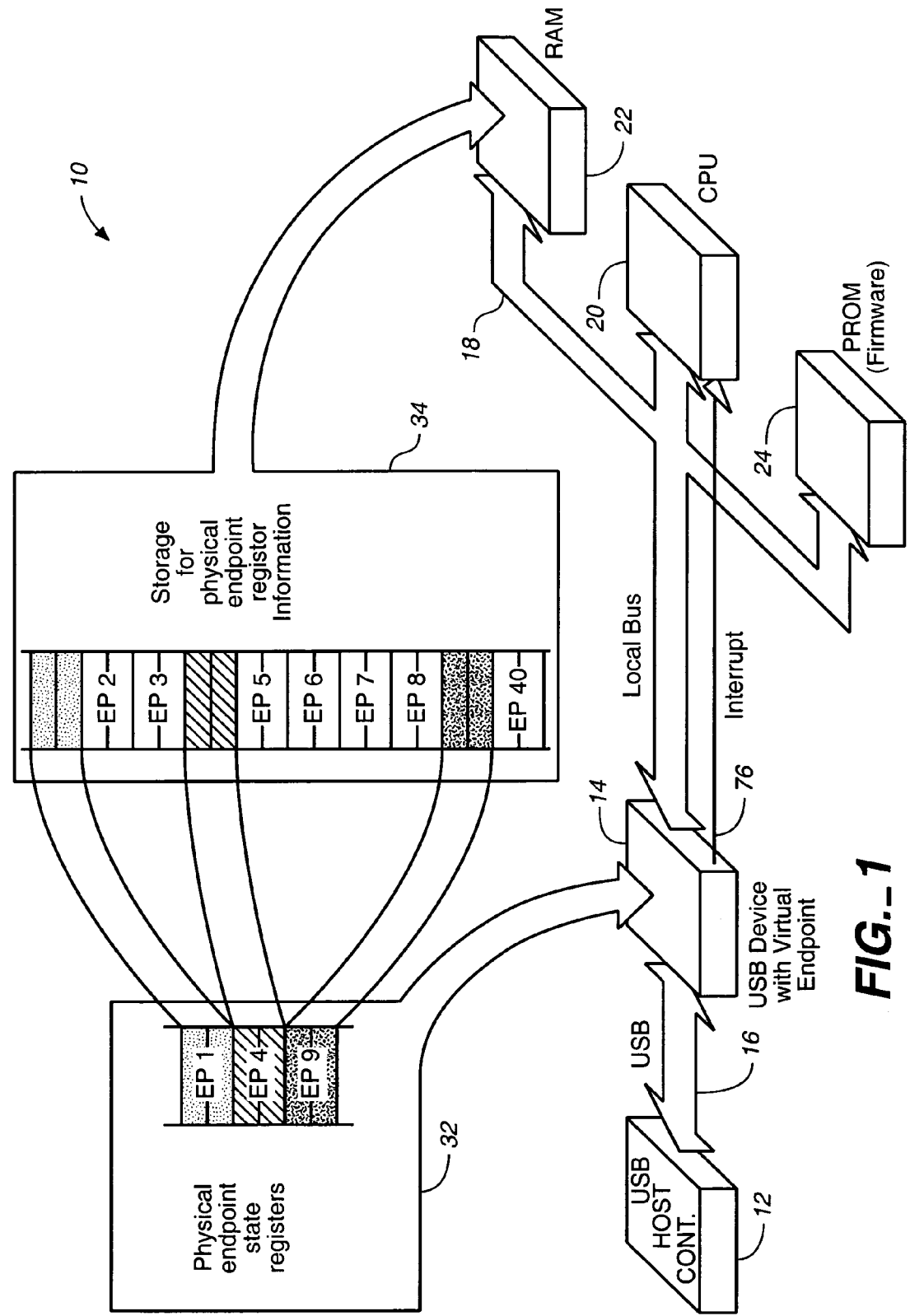
FIG._1

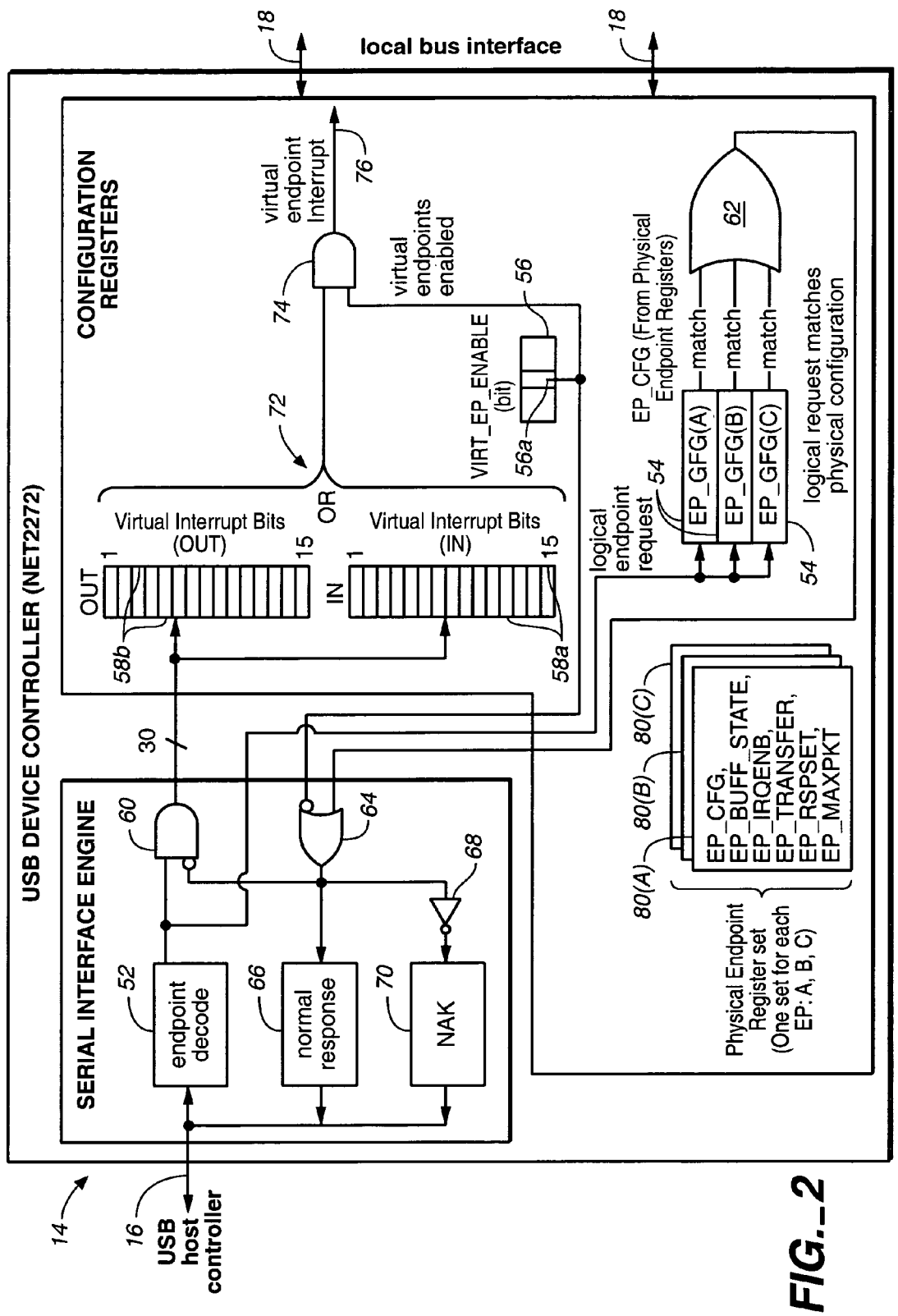
FIG._2

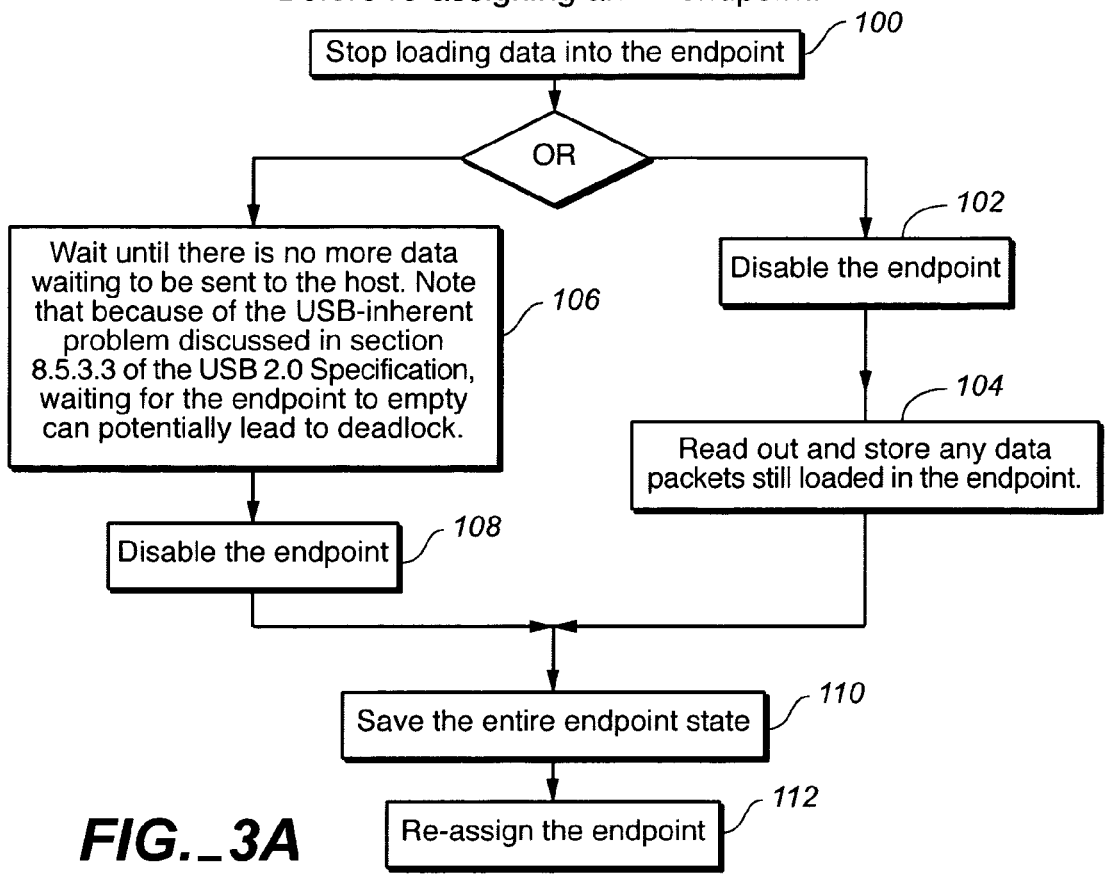
FIG._3A
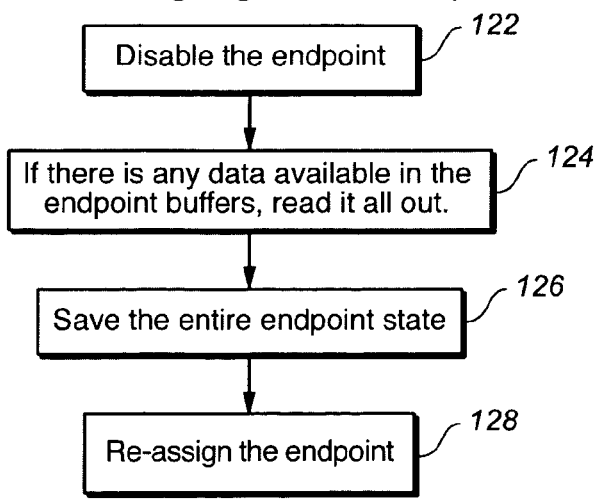
FIG._3B

VIRTUAL ENDPOINT FOR USB DEVICES

BACKGROUND OF THE INVENTION

This invention relates in general to Universal Serial Bus ("USB") devices, and in particular to the use of virtual endpoints in such devices.

An increasing number of different functions have now been incorporated in computer peripheral devices. These functions may include printing, signal transmission through telephone lines by means of modems, video and audio signal transmission, telephone communication and broadband transmission. The Universal Serial Bus ("USB") specification Revision 2.0 (referred to herein as "USB Specification", which is incorporated herein in its entirety by reference), available from http://www.usb.org/developers/docs.html, specifies up to 31 physical endpoints. Aside from endpoint zero which is used for default control, these endpoints may be used in a computer peripheral for controlling up to 30 communication or data pipes, each data pipe used for data transfer between the computer peripheral device and the host computer for supporting a particular application or function of the peripheral device.

As set forth in Section 5.3.1 of the USB Specification, an endpoint is a uniquely identifiable portion of a USB device that is the terminus of a communication flow between the host and device. Each USB logical device is composed of a collection of independent endpoints. Each logical device has a unique address assigned by the system at device attachment time. Each endpoint on a device is given at design time a unique device-determined identifier called the endpoint number. Each endpoint has a device-determined direction of data flow. The combination of the device address, endpoint number, and direction allows each endpoint to be uniquely referenced. Each endpoint is a simplex connection that supports data flow in one direction from the point of view of the host: either input (from device to host) or output (from host to device). In other words, a computer peripheral device may contain more than one USB logical device, where each logical device is treated separately by the host controller from another logical device in the same peripheral.

According to the USB Specification, the data pipes associated with all the endpoints except for endpoint zero are uni-directional. Thus, if data is to be transferred in both directions between the host computer and the peripheral device for a particular function or application, two data pipes would be required: one for the host computer to send data to the peripheral device and the other for the peripheral device to send data to the host computer. Certain types of functions or applications may require more than one data pipe in the same direction. For example, audio signals may require two or more data pipes for each direction for stereo sound or surround sound.

At the host side, the data transfer is handled by a microprocessor which sends tokens to the USB peripheral device requesting endpoints to support one or more applications. Such tokens would include information for identifying the data pipe involved and are known as logical endpoints. On the side of the USB device, hardware is used to support data transfer in the associated data pipe, where such hardware is known as a physical endpoint in accordance with the USB Specification. Each physical endpoint is associated with allocated memory (such as FIFOs) and registers. A match is found between a logical endpoint requested by the host with a physical endpoint in the USB peripheral device during initialization or during the process of establishing communication between the host and the device for data transfer through a particular data pipe.

When the host computer attempts to communicate with a USB peripheral device through a data pipe to support a particular function, the host computer will send a token containing information related to a logical endpoint for the data pipe. When the token is received by the USB device controller in the USB peripheral device, the USB device controller would match the logical endpoint information with that of the physical endpoints of the peripheral device. If a match is discovered, the USB device controller would respond to the host computer to establish the data pipe communication. If, however, the logical endpoint requested by the host computer is not found to match any one of the physical endpoints of the peripheral, such request by the host computer is simply denied so that the peripheral device is unable to support such function. This can, of course, be avoided if a USB device controller is designed with all 30 physical endpoints (in addition to endpoint zero) that are possible under the USB Specification.

However, if a USB device controller is designed with all 30 physical endpoints in addition to endpoint zero that are possible under the USB Specification, then the controller chip will become unnecessarily complex and requires a large die to accommodate all of the endpoints. Since typically many fewer functions or applications than 30 need to be supported simultaneously, if a USB device controller is designed with all 30 physical endpoints in addition to endpoint zero, then a large number of the physical endpoints would be idle most of the time. Including enough memory and registers to support all 30 physical endpoints in addition to endpoint zero is inefficient and costly.

Due to size and cost considerations explained above, most USB device controllers presently marketed do not include all 30 physical endpoints in addition to endpoint zero. In fact, most controllers contain only a few physical endpoints in addition to endpoint zero. In conventional designs, each physical endpoint in a computer USB device peripheral is identified with a particular data pipe and cannot be switched or changed to support a different data pipe between the host computer and the computer peripheral. Therefore, when computer peripherals are called upon to be increasingly versatile and perform many different functions, the few physical endpoints now being provided in the USB device controllers now on the market may not be adequate to support as many functions as desired by consumers. It is therefore desirable to provide USB devices with fewer physical endpoints than possible under the USB specification, where such devices still are adequate for supporting an increasing number of functions and applications desired by consumers in computer peripherals.

SUMMARY OF THE INVENTION

This invention is based on the recognition that instead of permanently assigning physical endpoints to corresponding data pipes, the concept of virtual endpoints may be used so that the controller can respond in a versatile manner to requests by the host it is in communication with. This is especially useful in situations where the number of endpoints required may exceed the number of physical endpoints available.

According to one embodiment of the invention, the physical endpoints are not permanently assigned to corresponding data pipes. Instead, a physical endpoint may be re-assigned to a different data pipe from the data pipe it was supporting previously. Thus, according to this embodiment, when the request for a logical endpoint for supporting a communication pipe with another device is received, the physical endpoints are checked to see whether any one of a set of one or more physical endpoints has been assigned to support the pipe. When it is discovered that none of the set of one or more physical endpoints has either been assigned and none is available to support the communication pipe, then one endpoint of the set is identified as the one to be re-assigned, and such physical endpoint is then re-assigned to the logical endpoint requested to support such pipe. When all of the functions desired can be adequately supported when needed, it does not matter that the total number of such functions that need to be served over time exceeds the total number of physical endpoints provided.

BRIEF DESCRIPTION OF THE DRAWINGS

FIG. 1 is a block diagram of a USB component having a USB device with virtual endpoint capability useful for illustrating the invention.

FIG. 2 is a schematic circuit diagram of the USB device with virtual endpoint capability of FIG. 1.

FIG. 3A is a flowchart for illustrating the operations of the system in FIG. 1 for re-assigning an IN endpoint to illustrate one aspect of the embodiment of FIG. 1.

FIG. 3B is a flowchart illustrating the operation of the system of FIG. 1 for re-assigning an OUT endpoint in one aspect of one embodiment of the invention.

For simplicity in description, identical components are labeled by the same numerals in this application.

DETAILED DESCRIPTION OF THE EMBODIMENTS

FIG. 1 is a block diagram of a USB device virtual endpoint system useful for illustrating one embodiment of the invention. As shown in FIG. 1, system 10 includes a USB host controller 12 in communication with a USB device 14 through a USB bus 16. Device 14 is equipped with virtual endpoint capability and is in communication with local bus 18 of system 10. The local bus 18 connects to device 14 a central processing unit ("CPU") 20, a random access memory ("RAM") 22 and a programmable read only memory ("PROM") 24. Where system 10 comprises a USB host controller 12 and a peripheral device, the CPU 20, RAM 22 and PROM 24 would all form part of the peripheral as would device 14.

Virtual Endpoint hardware support in device 14 (also referred to herein as the USB device controller) enables firmware in PROM 24 to implement any number of USB device endpoints up to the maximum of 15 per direction, excluding endpoint 0 (see the USB 2.0 Specification sections 8.3.2.2 and 9.6.6). Hardware support for endpoint virtualization includes the Virtual Endpoint registers in device 14 and the Virtual Endpoint Interrupt. These work in conjunction with the Physical Endpoint Configuration to provide full Virtual Endpoint support. Each physical endpoint (a number of which are shown in exploded box 32) of device 14 is also associated with allocated memory (such as FIFOs) and registers (shown in exploded box 34) in RAM 22.

In this application, "host" refers to the USB host controller, such as controller 12, "logical endpoint" refers to the endpoint number from the point of view of the host (as embedded in IN, OUT, and SETUP tokens), "physical endpoint" refers to the hardware endpoint (Physical Endpoint Configuration registers plus any other physical resources required to implement a functional endpoint) in device 14, and "unassigned endpoint" refers to a logical endpoint number that is not currently assigned to a physical endpoint (in any Physical Endpoint Configuration).

FIG. 2 is a block diagram showing in more detail the device 14 of FIG. 1. The physical endpoints provided in device 14 are labelled A, B, C etc. In other words, if four endpoints are provided in device 14, then they would be labelled A, B, C, D. Each of the physical endpoints is provided with a corresponding endpoint configuration register EP_CFG 54. Thus, endpoint A is provided with a corresponding endpoint configuration register EP_CFG(A), and endpoint B provided with a corresponding endpoint configuration register EP_CFG(B), and so on. Each of the endpoint configuration registers EP_CFG 54 is used to store the logical endpoint number referring to the data pipe that is supported by the physical endpoint corresponding to such register.

When the host controller 12 sends an IN or OUT token to device 14 through bus 16, where the token refers to or contains a logical endpoint, the USB Device Controller (device 14) determines whether the packet matches a currently enabled Physical Endpoint Configuration. If it matches, then the USB Device Controller responds normally to the token. This is performed by means of endpoint decoder 52, which decodes the token to find the logical endpoint number from the host point of view. This number is supplied to endpoint configuration registers EP_CFG 54 to match the logical endpoint numbers stored therein. The matching may be performed by many different ways, such as by means of comparators (not shown) in such endpoint configuration registers. If there is no match, and at least one physical endpoint has not been assigned yet to any logical endpoint, one of the unassigned physical endpoint will be assigned to support the data pipe indicated by the number, and the number will be stored in the endpoint configuration register EP_CFG 54 for such physical endpoint.

The feature of virtual endpoints in one embodiment of this invention may be turned on and off by setting a bit 56a in VIRT_EP_ENABLE register 56 by means of the CPU through local bus 18 (connection not shown). If the token does not match, and all of the physical endpoints have already been assigned, and Virtual Endpoint Enable is turned off as indicated by the bit value 56a (such as "0"), the USB Device Controller responds to a host request to an unassigned endpoint with a timeout (see USB 2.0 specification).

If the token does not match (because the logical endpoint requested by the host is currently unassigned to a physical endpoint) and Virtual Endpoint Enable is turned on as indicated by the bit value 56a equal to "1", Virtual Endpoint hardware support is activated. The USB Device Controller 14 responds to all host requests on all unassigned endpoints with a negative acknowledgement NAK. This causes the host to retry the request until an acknowledgement ACK (for OUT endpoints) or a data packet (for IN endpoints) is returned by the USB Device Controller (device 14).

Device 14 comprises 2 Virtual Interrupt registers 58a, 58b for storing bits corresponding to logical endpoint numbers for keeping track of which logical endpoint number needs to have an already occupied physical endpoint re-assigned to it in a manner transparent to the host, as a virtual endpoint. Thus, in addition to sending negative acknowledgement (NAKing), the USB Device Controller 14 sets the bit in the Virtual Interrupt register that corresponds to the requested logical endpoint number. In the embodiment illustrated in FIG. 2, two registers 58a, 58b are employed, one for logical endpoint numbers supporting data flow to the host (IN), and one for logical endpoint numbers supporting data flow from the host (OUT). For example, if the host requests an IN on endpoint 3 when none of the USB Device Controller physical endpoints are assigned to address 3 and direction IN, bit 3 of Virtual IN Endpoint register 58a is set (and the USB Device Controller NAKs the IN request). The setting of the registers 58a, 58b is through multiple (e.g. 30) AND-gates 60 that each provides a 1 bit output to register 58a or 58b and has two 1 bit inputs.

The endpoint decoder 52 decodes the token from the USB host controller o find the logical endpoint number requested by the host and supplies the logical endpoint number to the endpoint configuration registers 54 for comparison or matching. If the logical endpoint number in the token matches the number stored in one of the endpoint configuration registers, such register will provide a logical "1" output to OR gate 62. Thus, if there is a match, gate 62 will output a "1" to OR gate 64, which in turn will provide a logical "1" to the normal response block 66. The operation of the normal response block 66 is described in the USB Specification and need not be described here. This logical "1" is inverted when it appears as an input to each of the AND gates 60, which prevents the setting of the registers 58a and 58b. This logical "1" output of gate 64 is inverted by inverter 68 so that no negative acknowledgment will be sent by block 70 to the host controller 16. If, however, the comparators in registers 54 fail to find a match with the logical endpoint number supplied by decoder 52, all of the outputs of registers 54 will be low, and gate 62 will supply a logical "0" to gate 64. If the virtual endpoint enable bit 56a has been set to "1," then gate 64 will output a "0," which in turn prevents the normal response block 66 from sending its normal response to controller 16. After being inverted by inverter 68, such signal causes NAK block 70 to send negative acknowledgment in a manner known to those skilled in the art to controller 12 through bus 16 so that the host controller will continue to send tokens to request such logical endpoint. The low output of gate 64 is inverted by the bubble at each of the inputs to gates 60, so that the logical endpoint number at the output of decoder 52 obtained from decoding the token will be supplied to the inputs of the 30 gates 60 to set one of the bits in registers 58a and 58b to a "1". The values of the 30 bits in registers 58a and 58b are supplied in parallel to 30-input OR gate 72 whose 1 bit output is supplied to AND gate 74. If the virtual endpoint enable bit 56a has been set to a "1," and at least one of the bits in registers 58a, 58b has been set to a "1," then both inputs to AND gate 74 are high so that gate 74 will supply a virtual endpoint interrupt signal on line 76 to the CPU 20 as shown in FIG. 1.

While any of the Virtual Endpoint register bits are set (more than one can be set at any given time), the Virtual Endpoint Interrupt status will be true. This notifies the firmware in PROM 24 through interrupt 76 to the CPU 20 that the host has tried to access an unassigned endpoint. Firmware can then re-assign one of the physical endpoints to the new logical endpoint so the data transaction can proceed.

Virtual Endpoint participation is completely flexible: all physical endpoints (excluding endpoint 0) may participate in Virtual Endpoint re-assignment, or some physical endpoints can be dedicated to specific logical endpoints. Participation is controlled by firmware in PROM 24.

Endpoint Virtualization

Virtualization relies on the ability of the firmware to capture, preserve, and restore the complete physical endpoint state as it switches the available physical endpoint resourses between a larger number of logical endpoints (similar to a CPU context switch or virtual memory management). Virtual Endpoint hardware support in device 14 makes all the endpoint state information available to the firmware, and allows it to restore the state from information stored elsewhere in the USB device. This is done with the aid of three physical endpoint register sets 80(A), 80(B), 80(C) for endpoints A, B, C respectively (and more to follow if there are more than three endpoints A, B, C), one set for each physical endpoint.

When re-assigning endpoints, firmware takes care that USB traffic is not disturbed. Specifically, an endpoint is not reprogrammed or flushed while the endpoint is enabled.

Before re-assigning an IN endpoint, the firmware:
1. Stops loading data into the endpoint.
2a. Waits until there is no more data waiting to be sent to the host. Note that because of the USB-inherent problem discussed in section 8.5.3.3 of the USB 2.0 Specification, waiting for the endpoint to empty can potentially lead to deadlock.
3a. Disable the endpoint. OR
2b. Disable the endpoint.
3b. Read out and store any data packets still loaded in the endpoint.
4. Save the entire endpoint state.
5. Re-assign the endpoint.

Before re-assigning an OUT endpoint:
1. Disable the endpoint.
2. If there is any data available in the endpoint buffers, read it all out.
3. Save the entire endpoint state.
4. Re-assign the endpoint.

Re-assigning a physical endpoint includes restoring a different previously saved endpoint state into the Physical Endpoint Configuration of the physical endpoint identified to be re-assigned. This includes (but is not limited to) the direction, type, endpoint number, and possibly packets of data. In order for USB traffic in the data pipe supported previously by the re-assigned physical endpoint to flow without interruption, every detail of the previously saved state of the re-assigned physical endpoint is correctly restored to the physical endpoint (whether or not this is the re-assigned physical endpoint) that is used subsequently to support such data pipe.

When the CPU 20 receives a Virtual Endpoint Interrupt from device 14 (USB device controller), the CPU first reads the values of registers 58a and 58b from local bus (bus connection to registers 58a and 58b not shown to simplify the figure) and identifies a particular physical endpoint that is to be re-assigned. But before the re-assignment is performed, the CPU performs operations that would prevent data from being lost. Furthermore, the CPU would perform operations indicated by firmware in PROM 24 that would store the state of the physical endpoint that is to be re-assigned, so that they may be restored later on. This is particularly useful where a computer peripheral is performing more functions or applications at the same time than the number of physical endpoints available. For example, in order to serve all of the functions or applications, each physical endpoint may be used to serve two functions alternately. Thus, physical endpoint A may be used for both facsimile transmission through a modem as well as for a printing operation. To prevent data from being lost, before the physical endpoint is re-assigned from one operation to another, to increase efficiency, it is preferable to first store the state of the physical endpoint prior to the re-assignment, so that when the physical endpoint is then returned to the previous operation, the state of the physical endpoint may be restored to its previous state. In this manner, delay in resetting the endpoint may be avoided for increased efficiency.

Instead of dedicating one physical endpoint to two applications by using the same physical endpoint alternatingly to support data transfer for the two applications, the CPU 20 may carry out one of many different schemes to enhance efficiency, such as by taking turns in round robin fashion. Thus, the CPU may poll the different endpoints to ascertain their states prior to the decision to re-assign the endpoints. Other factors may also be taken into consideration. For example, it would be less efficient if a physical endpoint is re-assigned before it has had a chance to support the transmission of at least a minimum number of data packets. In one embodiment, such minimum number of data packets may be as low as 1.

In one scheme, the CPU may simply poll the different physical endpoints and select them either in a round robin scheme or simply randomly. Such and other variations are within the scope of the invention.

The above-described operations are illustrated further by reference to the flowcharts in FIGS. 3A and 3B. In reference to FIG. 3A, for the re-assignment of IN endpoints, first firmware in PROM 24 would stop the loading of data into the physical endpoint that is to be re-assigned (block 100). Then the firmware may simply disable the endpoint so that it stops supporting the prior application and the data pipe to which it is assigned (block 102). In such event, there may still be data packets that have been loaded into the physical endpoint that still have not been sent to the host controller 12 so that such data packets are read out and stored. In reference to FIG. 1, the data loaded into the endpoint and not sent to the host (e.g., endpoint ("EP")1) are then stored in the RAM 22 through the local bus 18 under the control of the CPU 20 (block 104).

Alternatively, the firmware may decide to wait for all of the data loaded into the endpoint to be transmitted to the host through the USB bus 16 before the endpoint is disabled (block 106). Thus, the firmware may first ascertain the volume of data that is being stored at the endpoint in device 14 before deciding whether it is worthwhile to wait for all of the data to be transmitted to the host. If only a small amount of data loaded into the endpoint has not been sent to the host, the firmware in PROM 24 may be designed to wait until all of the data has been transmitted to the host to increase efficiency. On the other hand, if completing the data transmission would cause too much delay, the firmware may be designed to first disable the endpoint and store the data in RAM 22 as described above. Thus, if the firmware waits until there is no more data waiting to be sent to the host, the firmware then disables the endpoint when it detects that all of the data loaded into the endpoint have been transmitted to the host. The firmware then disables the endpoint (block 108) and the system proceeds to save the endpoint state and re-assign the endpoint (blocks 110 and 112). In either case, the firmware then saves the entire endpoint state that is stored in the corresponding physical endpoint register set 80. Thus, if endpoint A is to be re-assigned, then all of the contents of the register set 80(A) would be stored again in RAM 22 under the control of CPU 20 through the local bus 18 (block 110). Such endpoint state is stored for the logical endpoint (e.g. logical endpoint 3) that is supported by physical endpoint A. The firmware then re-assigns the physical endpoint (e.g. physical endpoint A) (block 112) and writes the logical endpoint number requested by the host into the corresponding EP_CFG register 54 for such endpoint. The logical endpoint number (e.g. logical endpoint 5) requested by the host can be read by the CPU from the 30 bit values in registers 58a and 58b and then written to the corresponding EP_CFG register 54.

FIG. 3B is a flowchart illustrating an operation for re-assigning an OUT endpoint. The host requests support for a logical endpoint to which no physical endpoint has been assigned. The physical endpoint selected by the CPU 20 and firmware is disabled so that it no longer supports the application and the data pipe and the associated logical endpoint it is previously assigned to (block 122). If there is any data loaded in the endpoint buffers in device 14, all of the data is read by the CPU under the control of firmware in PROM 24 and stored in RAM 22 (block 124). Then the entire state of the endpoint stored in physical endpoint register set for the corresponding endpoint is read and stored in RAM 22 (block 126) for the logical endpoint that is previously supported by the physical endpoint that is to be re-assigned. The endpoint is then re-assigned (block 128).

As described above, the overall process of re-assigning physical endpoints includes storing (blocks 110, 126) for a logical endpoint (e.g. logical endpoint 3) the state of the physical endpoint that is to be re-assigned (e.g. to support logical endpoint 5), where such physical endpoint is supporting such logical endpoint (e.g. logical endpoint 3) before the re-assignment (e.g. to support logical endpoint 5). If, at a later time, the host again sends a token requesting support for logical endpoint 3, as part of the re-assigning process in blocks 112 and 128, the firmware would fetch the previous physical endpoint state for the logical endpoint 3 stored in RAM 22 and restore it to the re-assigned physical endpoint to speed up the process. The process described above in reference to FIGS. 3A, 3B may be repeated in a predetermined manner (e.g. round robin) when there are multiple requests for logical endpoints.

Efficiency Considerations

Depending on the number of virtual endpoints and the host-controller requirements, firmware may need to prioritize virtual endpoint re-assignment. For example, a simple scheme of scheduling the lowest virtual endpoint request each time might end up starving higher logical endpoint addresses. A "round-robin" priority is one method to ensure at least some data travel on all endpoints. Note that INTERRUPT endpoints may require special care because the polling interval between accesses can be very long. It is not efficient to detect the endpoint access on an INTERRUPT endpoint (which was NAKed), switch to that endpoint, and then detect and switch to a different endpoint before the next INTERRUPT polling interval arrives. One possible solution is for firmware to "lock down" the physical endpoint (prevent further endpoint switching) until a minimum number of packets have passed through the endpoint.

Deadlock Considerations

Usually, the USB host-controller retries NAKed BULK transactions in a "round-robin" priority, so deadlocks will not normally occur. However, it is possible that some host drivers may be susceptible to deadlocks. Specific device and host driver implementations should be evaluated for deadlock exposure. For example, step 2a of re-assigning an IN endpoint (above) requires firmware to wait until the physical endpoint is empty. If the host is not requesting data on the (old) logical endpoint, but is instead waiting for a transaction on the new logical endpoint (the logical endpoint firmware is trying to switch to, but is prevented because the physical endpoint is not empty), deadlock occurs.

Another potential source of deadlock is the USB-inherent problem discussed in section 8.5.3.3 of the USB 2.0 Specification. In this situation, the endpoint is not able to flush the final packet of a transfer because it does not know that the host has received it correctly, and the host may not send another IN on the same endpoint for an indeterminate time.

Virtual Endpoint hardware support allows a USB device to expand a limited number of physical endpoints to the full number of endpoints allowed by the USB specification. Firmware can track and assign the available physical endpoints to the dynamically required logical endpoints with full flexibility. Any number of endpoints required by any host driver (including USB Class Drivers) can be supported.

Although only certain exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method for assigning physical endpoints among a set of physical endpoints of a USB device to support communication pipes with a host, said method comprising:
   in response to a request for a first logical endpoint for supporting a communication pipe with a host, the USB device checking whether any one of the set of physical endpoint(s) of the USB device has been assigned to support such pipe;
   the USB device identifying one of the set of physical endpoint(s) of the USB device as the one to be re-assigned to the first logical endpoint to support such pipe when none of said set of physical endpoint(s) is available; and
   the USB device re-assigning the identified physical endpoint of the USB device to the first logical endpoint to support such pipe in a manner transparent to the host.

2. The method of claim 1, further comprising the USB device storing a state of said identified endpoint prior to the re-assignment.

3. The method of claim 2, further comprising the USB device restoring said stored state of said re-assigned physical endpoint after use of the re-assigned physical endpoint to support such pipe has been completed.

4. The method of claim 1, wherein said identified physical endpoint was previously assigned to a second logical endpoint prior to the re-assignment, said method further comprising the USB device stopping transmission of data in a pipe between said identified physical endpoint and the second logical endpoint prior to the re-assignment.

5. The method of claim 1, wherein said identified physical endpoint was previously assigned to a second logical endpoint prior to the re-assignment, said method further comprising the USB device disabling said identified physical endpoint prior to the re-assignment.

6. The method of claim 5, further comprising the USB device waiting for data at the identified physical endpoint to be sent to the host before disabling said identified physical endpoint.

7. The method of claim 5, further comprising the USB device storing data at the identified physical endpoint after disabling said identified physical endpoint.

8. The method of claim 1, further comprising the USB device repeating the checking, identifying and re-assigning in response to each additional request when there are multiple requests for logical endpoints.

9. The method of claim 8, wherein said repeating by the USB device is performed in a round-robin priority in response to the multiple requests.

10. The method of claim 8, wherein the repeating in response to each additional request is delayed by the USB device until a predetermined amount of data has passed through a previously re-assigned physical endpoint.

11. The method of claim 1, wherein said device sends a negative acknowledgement to the host when none of the set of physical endpoint(s) has been assigned to support such pipe.

12. The method of claim 11, wherein the negative acknowledgement sent to the host by the device causes the host to continue sending tokens to the device to request the first logical endpoint.

13. A USB apparatus that assigns physical endpoints among a set of physical endpoints to support communication pipes with a host, said apparatus comprising:
   a set of physical endpoint(s);
   a circuit that responds to a request for a first logical endpoint for supporting a communication pipe with a host device by checking whether any one of the set of physical endpoint(s) has been assigned to support such pipe; and
   a processor that identifies one of the set of physical endpoint(s) as the one to be re-assigned to the first logical endpoint to support such pipe when none of said set of physical endpoint(s) is available, and re-assigns the identified physical endpoint to the first logical endpoint to support such pipe in a manner transparent to the host device.

14. The apparatus of claim 13, wherein the processor causes a state of said identified endpoint to be stored prior to the re-assignment.

15. The apparatus of claim 14, wherein the processor causes said stored state of said re-assigned physical endpoint to be restored after use of the re-assigned physical endpoint to support such pipe has been completed.

16. The apparatus of claim 14, further comprising a storage storing information related to the state of physical endpoint that has been re-assigned.

17. The apparatus of claim 16, wherein the information stored relates to one or more of the following: direction of data flow, type, endpoint number, maximum packet size and data stored at the physical endpoint.

18. The apparatus of claim 13, wherein said identified physical endpoint was previously assigned to a second logical endpoint prior to the re-assignment, wherein the processor causes transmission of data in a pipe between said identified physical endpoint and the second logical endpoint to be stopped prior to the re-assignment.

19. The apparatus of claim 13, wherein said identified physical endpoint was previously assigned to a second logical endpoint prior to the re-assignment, wherein the processor causes said identified physical endpoint to be disabled prior to the re-assignment.

20. The apparatus of claim 19, wherein the processor causes data at the identified physical endpoint to be sent to the device before disabling said identified physical endpoint.

21. The apparatus of claim 19, wherein the processor causes data at the identified physical endpoint to be stored after disabling said identified physical endpoint.

22. The apparatus of claim 13, wherein said circuit sends a negative acknowledgement to the device when none of the set of physical endpoint(s) has been assigned to support such pipe.

23. The apparatus of claim 13, further comprising a storage storing information related to logical endpoints to which one or more of the set of physical endpoint(s) have been assigned.

24. The apparatus of claim 23, wherein the circuit checks whether any one of the set of physical endpoint(s) has been assigned to support such pipe by comparing information in the storage to information related to the first logical endpoint.

25. The apparatus of claim 23, wherein the processor causes information related to the first logical endpoint to be stored in the storage when re-assigning the identified physical endpoint to the first logical endpoint.

26. The apparatus of claim 13, further comprising a storage storing information related to the physical endpoint that has been re-assigned.

27. The apparatus of claim 26, wherein the information stored relates to one or more of the following: direction of data flow, type, endpoint number, maximum packet size and data stored at the physical endpoint.

28. The apparatus of claim 13, the circuit repeating the checking, and the processor repeating the identifying and re-assigning in response to each additional request when there are multiple requests for logical endpoints.

29. The apparatus of claim 28, wherein said repeating is performed in a round-robin priority in response to the multiple requests.

30. The apparatus of claim 28, wherein the repeating in response to each additional request is delayed until a predetermined amount of data has passed through a previously re-assigned physical endpoint.

31. The apparatus of claim 13, further comprising a storage storing information related to the logical endpoint requested in the request.

32. The apparatus o claim 13, further comprising a second circuit providing an interrupt to the processor in response to the request.

33. The apparatus of claim 32, said second circuit comprising a first storage storing information related to the logical endpoint requested in the request.

34. The apparatus of claim 33, said second circuit further comprising a second storage storing information for disabling the re-assignment by the processor.

35. The apparatus of claim 34, said second circuit further comprising a gate providing said interrupt signal in response to the information stored in the first and second storage.

36. The apparatus of claim 22, wherein the negative acknowledgement sent to the host device by the circuit causes the host device to continue sending tokens to the apparatus to request the first logical endpoint.

* * * * *